Feb. 10, 1925. 1,525,977
T. BIVER
ANTISKID TIRE ARMOR
Filed Feb. 23, 1924
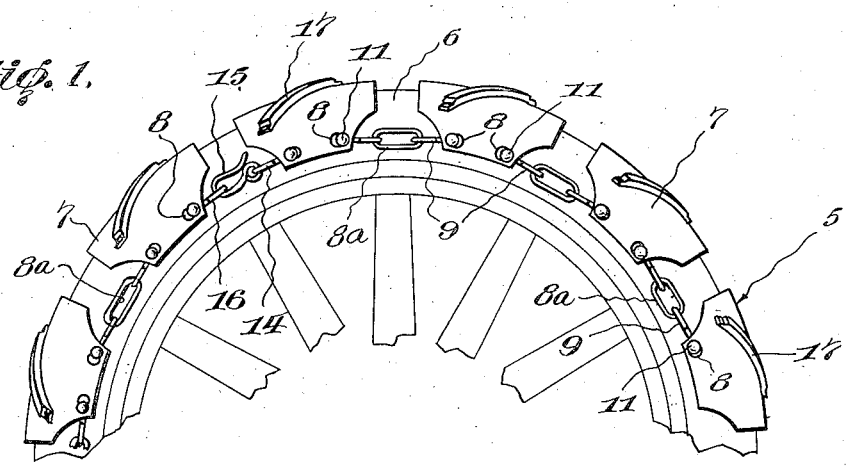
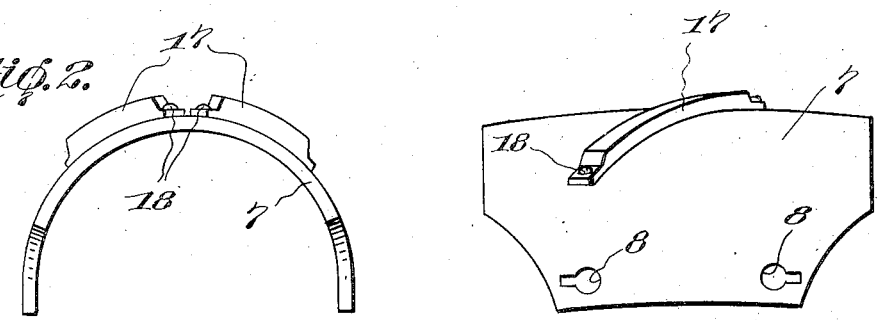
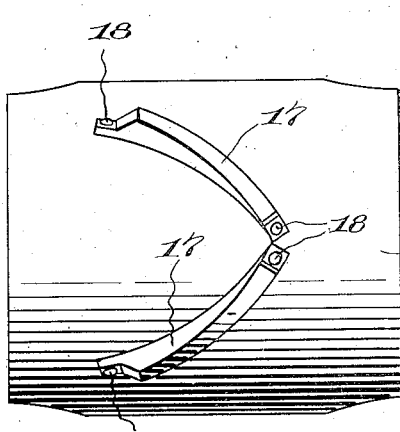
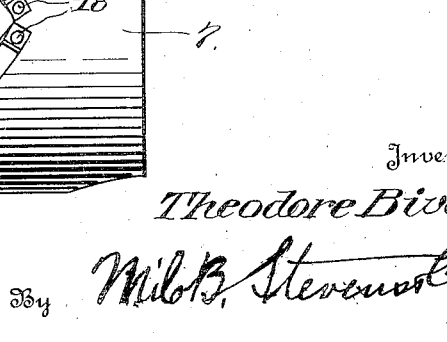
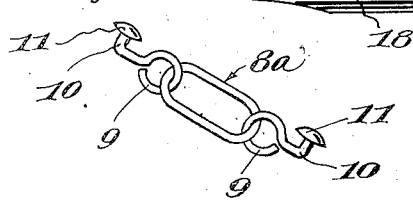
Inventor:
Theodore Biver
By Milo B. Stevens & Co.
Attorneys Patented Feb. 10, 1925.

1,525,977

UNITED STATES PATENT OFFICE.

THEODORE BIVER, OF CHICAGO, ILLINOIS.

ANTISKID TIRE ARMOR.

Application filed February 23, 1924. Serial No. 694,740.

*To all whom it may concern:*

Be it known that I, THEODORE BIVER, a citizen of the United States, residing at Chicago, in the county of Cook and State of Illinois, have invented new and useful Improvements in Antiskid Tire Armors, of which the following is a specification.

This invention relates to traction devices especially adapted for use on motor vehicle wheels.

An important object of this invention is to provide a traction device which may be quickly and conveniently applied to a pneumatic tire and which will prevent skidding and rapid wear on the tire.

A further object is to provide a tire armor which will effectively protect the tire and prevent frequent punctures.

A further object is to provide a tire armor which will not in any way damage the tire and which may be economically manufactured.

Other objects and advantages will be apparent during the course of the following description.

In the accompanying drawing forming a part of this application and in which like numerals are employed to designate like parts throughout the same, Figure 1 is a fragmentary side elevation of the improved tire armor applied;

Fig. 2 is an end view illustrating one of the plates or armor members embodied in the invention;

Fig. 3 is a side elevation of one of the armor sections;

Fig. 4 is a plan view of one of the armor sections, and

Fig. 5 is a side elevation of a connecting member embodied in the invention.

In the drawing, wherein for the purpose of illustration is shown a preferred embodiment of the invention, the numeral 5 generally designates the improved armor which as illustrated in Fig. 1 is adapted to be arranged about a tire casing 6 to prevent skidding and to protect the tire from rapid wear and frequent punctures.

The improved armor comprises a plurality of longitudinally and transversely spaced sections or plates 7, the ends of which are reduced and are arranged on opposite sides of the tire and are provided with key hole slots 8.

The several spaced armor sections are detachably connected by connecting chains 8ª having end links 9 provided with shanks 10, the terminal portions of which are formed with heads 11 to hold the several short connecting chains in place. More specifically, the shanks 10 are provided with laterally directed terminal portions extending through the narrow portions of the key hole slots 8 and the head 11 will bear flatly against the outer side of the plate and thereby hold the several connecting chains in place. When it is desired to take the armor from the tire it is merely necessary to move the heads 11 through the enlarged portions of the key hole slots 8 so that the heads 11 may be moved through the slots for detaching the chains.

The sections may also be connected by short connecting chains 14 having their ends provided with hooks 15 adapted to be engaged with attaching links 16 similar in construction to the links 9.

In carrying out the invention, each sections 7 is curved longitudinally and transversely and is provided on its outer side with V-shaped traction members consisting of diagonally extending legs 17, the ends of which are riveted to the plate as indicated at 18.

In use the spaced sections 7 will effectively protect the tire and prevent rapid wear and frequent punctures. The diagonally extending traction ribs will provide good traction and when the same wear they may be readily replaced as the rivets 18 or other suitable fastening devices may be quickly removed.

Having thus described the invention, what is claimed is:

A tire armor comprising a plurality of plates having their ends reduced and formed with key hole slots, flexible connecting members having their ends extending through said slots and provided with retaining heads, said plates being provided with ground engaging means.

In testimony whereof I affix my signature.

THEODORE BIVER.